United States Patent [19]

Deis et al.

[11] Patent Number: 5,631,640
[45] Date of Patent: May 20, 1997

[54] THREAT AVOIDANCE SYSTEM AND METHOD FOR AIRCRAFT

[75] Inventors: David L. Deis; Robert M. Gjullin, both of Corrales, N.M.

[73] Assignee: Honeywell Inc., Minneapolis, Minn.

[21] Appl. No.: 393,513

[22] Filed: Feb. 21, 1995

Related U.S. Application Data

[63] Continuation of Ser. No. 182,892, Jan. 18, 1994, abandoned.

[51] Int. Cl.$^6$ .................................................. G08G 5/04
[52] U.S. Cl. ........................ 340/961; 342/29; 342/65; 364/441; 364/461
[58] Field of Search ............................... 340/945, 961, 340/988, 968, 980; 364/424.06, 429, 439, 441, 461, 462; 342/29, 36, 453, 65

[56] References Cited

U.S. PATENT DOCUMENTS

| | | | |
|---|---|---|---|
| 3,668,403 | 6/1972 | Meilander | 364/441 |
| 4,063,073 | 12/1977 | Strayer | 364/439 |
| 4,760,396 | 7/1988 | Barney et al. | 342/65 |
| 4,812,990 | 3/1989 | Adams et al. | 364/461 |
| 4,862,373 | 8/1989 | Meng | 364/461 |
| 4,882,590 | 11/1989 | Huss et al. | 342/453 |
| 4,903,216 | 2/1990 | Huss et al. | 364/518 |
| 4,914,733 | 4/1990 | Gralnick | 364/461 |
| 5,058,024 | 10/1991 | Inselberg | 364/461 |
| 5,086,396 | 2/1992 | Waruszewski, Jr. | 364/454 |

*Primary Examiner*—Brent A. Swarthout
*Attorney, Agent, or Firm*—Kenneth J. Johnson

[57] ABSTRACT

A computer-based process for rapidly responding to previously unknown threats to airborne aircraft. The process makes quick, automatic decisions when required for close-range threats, yet provides the aircraft operator an opportunity to choose the appropriate response when time permits.

5 Claims, 5 Drawing Sheets

THREAT AVOIDANCE SYSTEM AND METHOD FOR AIRCRAFT

GOVERNMENT RIGHTS

The Government has rights in this invention pursuant to Contract No. F33600-88-G-5107, awarded by the Department of the Air Force.

This application is a continuation of application Ser. No. 08/182,892, filed Jan. 18, 1994, and now abandoned.

BACKGROUND OF THE INVENTION

This invention relates generally to computer-based systems for navigating aircraft and, more particularly, to a system and method for detecting and responding to unanticipated threats to aircraft.

In planning the route of an aircraft's mission, known threats such as hostile ground fire, military bases, etc., are taken into account. The planned route, which is stored in the aircraft's computer system, includes a starting point, a number of intermediate waypoints, and an ending point. The distance between each waypoint is measured in nautical miles and is referred to as a leg. Thus, a planned route consists of a number of connected legs that angle around known threats to provide the shortest and safest route between the aircraft's starting point and its ultimate mission destination (endpoint). The route is planned such that there is no "threat intervisibility," i.e., the aircraft being detectable by the threat.

However, the route planning must also take into account the problem of unplanned threats, unknown at the time, which might "pop up" during the mission. When an unknown threat appears, steps must be taken to avoid detection by the threat without compromising the mission's objectives.

Prior approaches to this problem are too inflexible. When an unknown threat pops up during a mission, the aircraft's computer system automatically directs the aircraft to change course and steer along one of a number of predetermined evasive legs. While the aircraft is changing course, the system attempts to recognize the threat and to calculate the intervisibility of the threat. If the planned route intersects the threat's intervisibility, then a route change is calculated from the end of the evasive leg to the next waypoint. If the proposed route change still intersects the threat's intervisibility, then a second route change is calculated from the end of the evasive leg to the following waypoint, and so forth. However, this approach is too mechanical. It limits the options of the aircraft operator, forces evasive maneuvers that are not optimized for the unknown threat, and is often too slow.

An object of the invention, therefore, is to provide an improved method for an airborne aircraft to respond to an unanticipated threat. More specifically, an object of the invention is to provide a system and method that rapidly responds to unknown threats in a timely and safe manner. With the method of the invention, quick decisions are made when required for close-range threats, yet the aircraft operator is given maximum flexibility to choose a response when time permits.

SUMMARY OF THE INVENTION

The invention comprises a computer-based method and system for rapidly responding to previously unknown threats to an airborne aircraft. The method makes quick, automatic decisions when required for close-range threats, yet provides the aircraft operator an opportunity to choose the appropriate response when time permits.

In the method of the invention, a previously unknown threat is detected. It is then determined if the aircraft's planned route intersects intervisibility with the threat. If not, the planned route is maintained. However, if it is determined that the two will intersect, then the response depends on how far the intersection is from the aircraft. If the intersection is less than a predetermined distance, a route change is automatically executed. If the intersection is farther away and thus the aircraft has time to maneuver, the aircraft operator is notified. Meanwhile, the severity of the threat is checked against possible clearance levels to determine if the planned route may be "cleared," i.e., maintained at a lower, acceptable clearance level (flying altitude). If an acceptable clearance level exists, the aircraft operator is permitted to maintain the planned route or to choose the route change. Thus, the operator is permitted to manually respond to a threat where such permission does not endanger the aircraft.

The step of executing a route change may include calculating a startpoint for the route change and determining the next waypoint in the planned route change beyond the startpoint. If the next waypoint is less than a predetermined distance from the aircraft, a waypoint following the next waypoint may be chosen as an endpoint for the route change. If the next waypoint is greater than the predetermined distance from the aircraft, the next waypoint may be chosen as the endpoint for the route change, unless the threat's intervisibility also intersects the route planned between the next waypoint and the following waypoint.

In accordance with the invention, a system for an airborne aircraft to respond to an unknown threat includes means for detecting a previously unknown threat. The system also includes means for determining if the aircraft's planned route intersects intervisibility with the threat and, if so, for responding in the manner described above.

The foregoing and other objects, features, and advantages of the invention will become more apparent from the following detailed description of a preferred embodiment which proceeds with reference to the accompanying drawings.

DETAILED DESCRIPTION OF A PREFERRED EMBODIMENT

To better appreciate and understand the scope of the invention, we will first describe a favored approach in the prior art to the problem of aircraft avoiding previously unknown threats that appear without warning.

Figure 1:
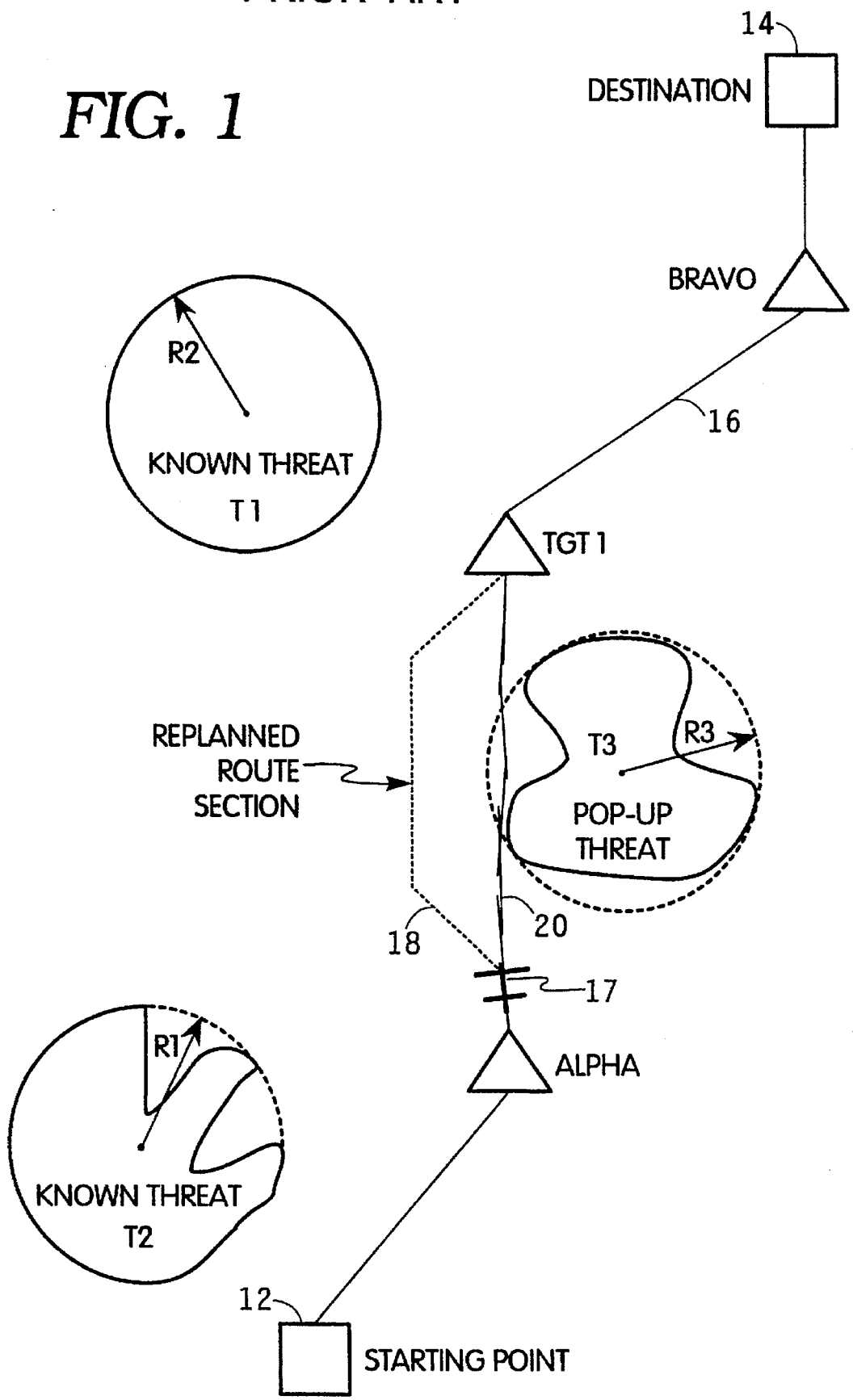
FIG. 1 is a pictorial diagram of how an aircraft using a prior art approach responds to known and previously unknown threats.

FIG. 1 illustrates the prior art approach. Known threats such as T1, an antiaircraft battery, and T2, a radar site, are characterized in the route planning stage as centroids, each with a maximum intervisibility. Intervisibility is the capability of both the threat and the aircraft to detect, or be visible to, each other. Ideally, the aircraft detects the threat before intersecting a threat's intervisibility. The nature of the terrain affects intervisibility. For example, the T1 centroid is not circular because a mountain range may block the view of the aircraft battery.

A planned route 10 includes a starting point 12, and ending point or destination 14, and a number of intermediate waypoints such as Alpha, TGT1 and Bravo, shown in the figure. Connecting each pair of waypoints of the route is a leg, such as leg 16 between waypoints TGT1 and Bravo. A leg has a general compass heading and is measured in nautical miles (NM). The complete planned route thus looks like an articulated path, angling around known threats to avoid intersecting threat intervisibility regions.

When an unknown threat T3, such as a mobile missile site, pops up during a mission, the prior approach automatically steers the aircraft 17 along one of a number of predetermined evasive headings. The computer system calculates the intervisibility for the new threat while the aircraft changes course to this new route. In the example of FIG. 1, the aircraft is just beyond the waypoint Alpha when T3 is encountered. If the threat's maximum intervisibility radius R3 may intersect the route, the aircraft is automatically steered along evasive leg 18. A new leg is then plotted from the end of the evasive leg 18 to the next waypoint TGT1 and checked to determine if the new leg intersects the intervisibility radii of threats T1 through T3. If the new leg does intersect the threat, then another leg is plotted from the end of the evasive leg to the following waypoint Bravo. This process continues until a safe leg is found.

While the prior approach is effective, it has a number of drawbacks. First, it limits the options of the aircraft operator, who may be the pilot or an additional navigator. The initial, automatic route change is made before a determination whether the intervisibility of the previously unknown threat actually intersects the planned route. For example, the intervisibility of T3 does not actually intersect the leg 20. Secondly, it forces the aircraft operator to make unnecessarily large evasive maneuvers. Thirdly, the prior approach is relatively slow because it often causes an excessive number of route changes to be calculated in the pursuit of a safe route.

Figure 2:
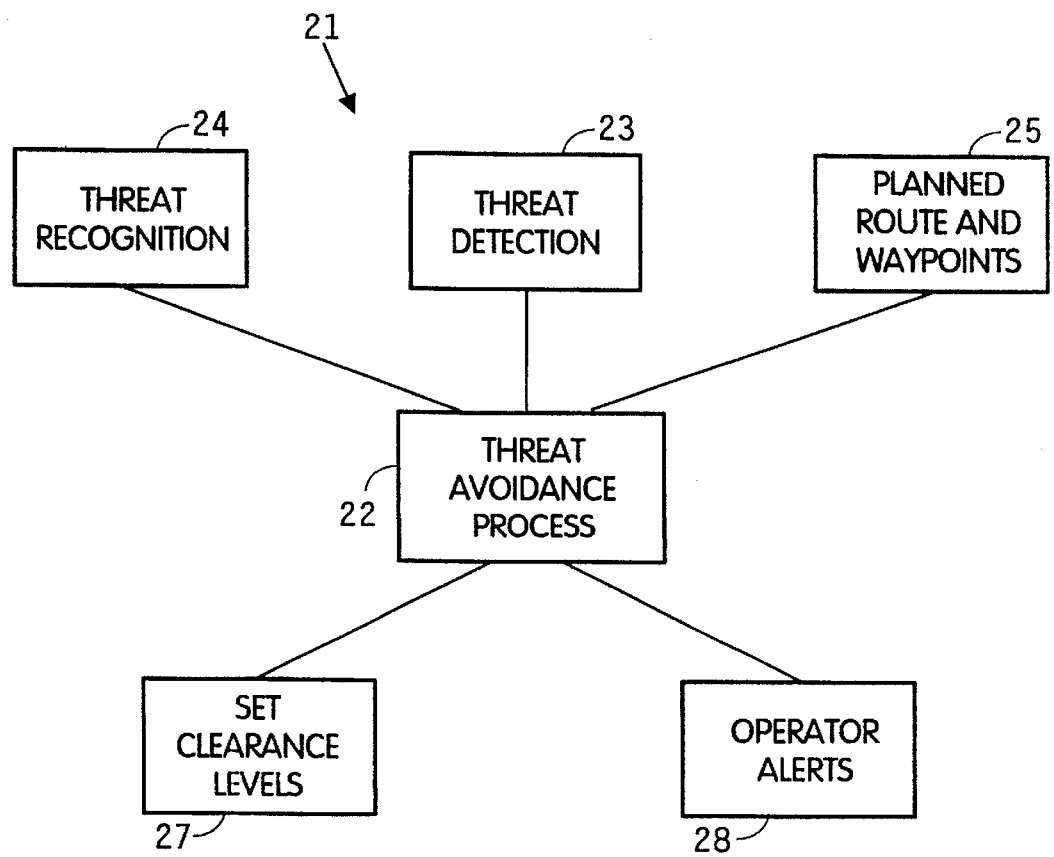
FIG. 2 is a structure chart of a threat avoidance system according to the invention, implemented in the aircraft's computer system.
Figure 3C:
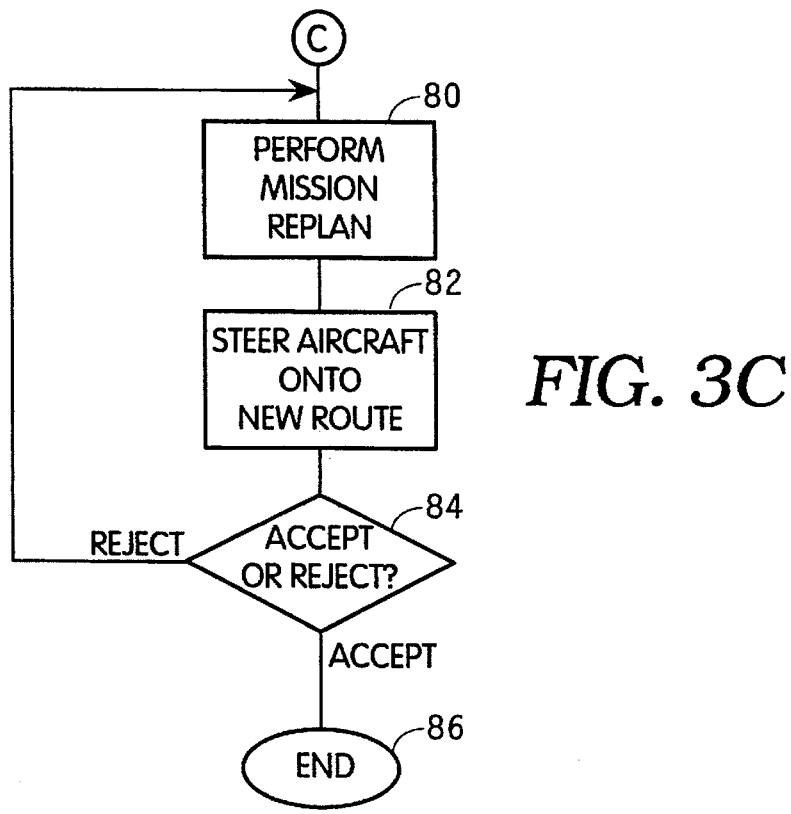
FIGS. 3A through 3C are flow charts of a threat avoidance process according to the invention.
Figure 3A:
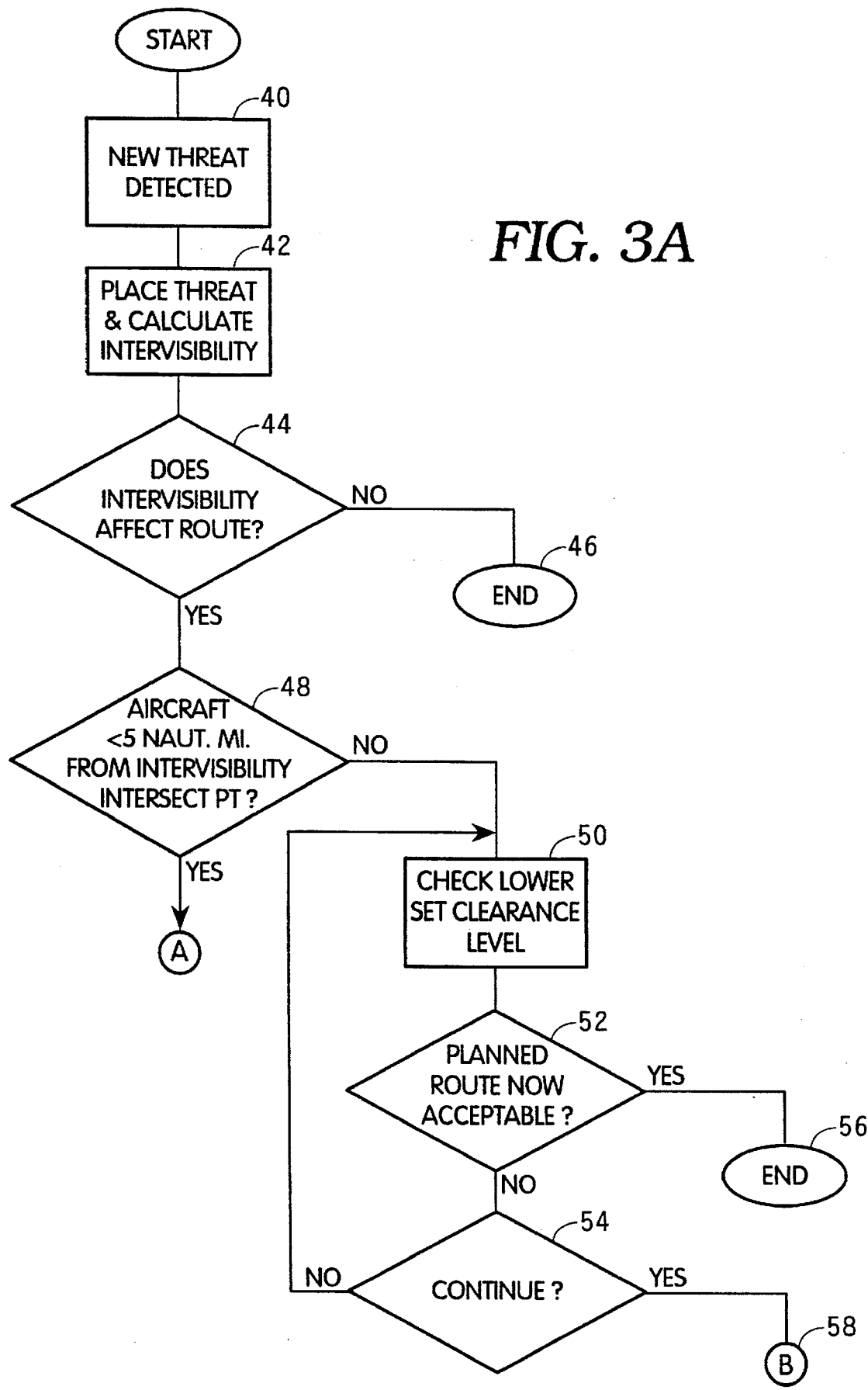
Figure 3B:
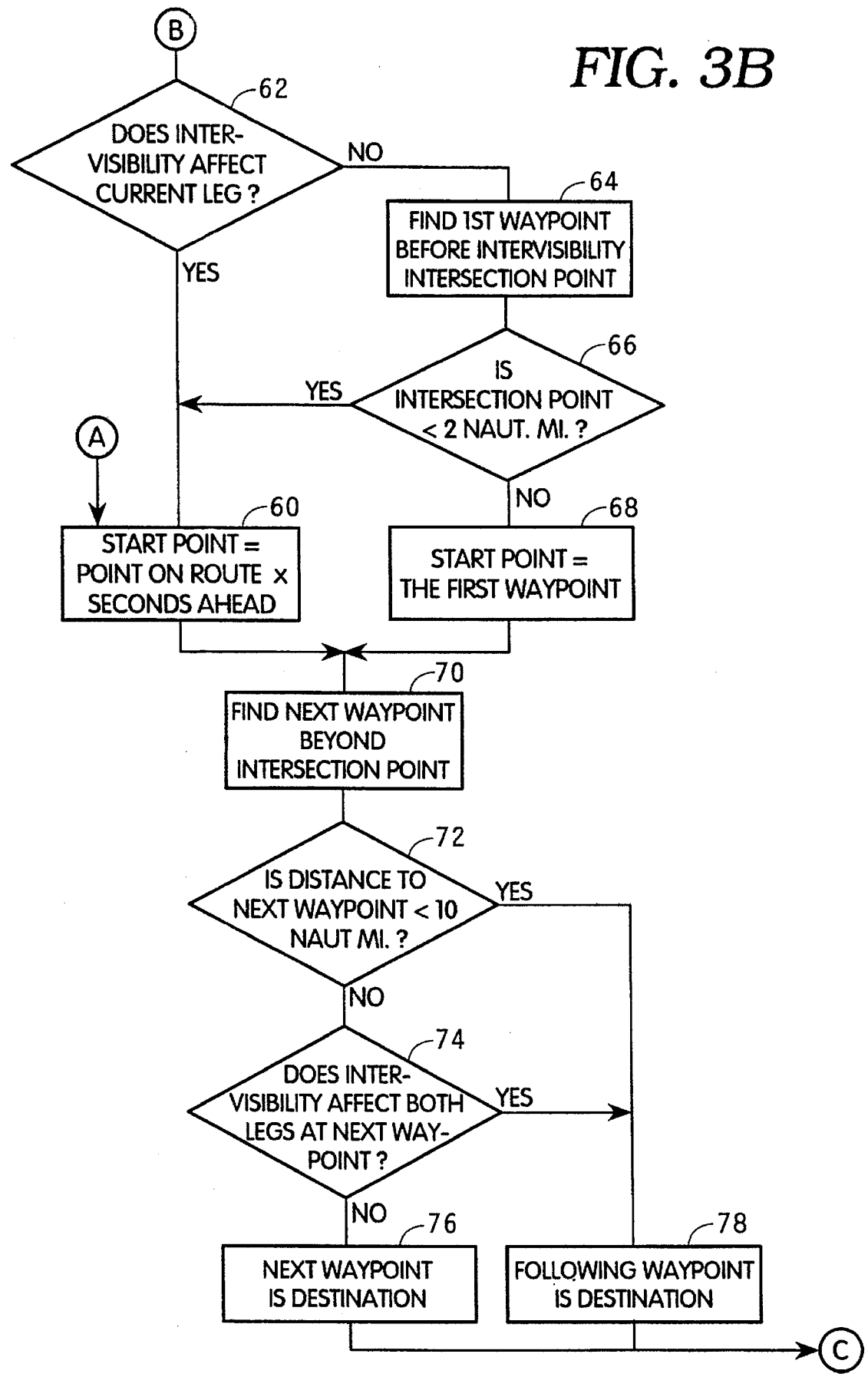

The method and system of the invention provide considerable advantage over this prior approach. FIG. 2 is an architectural view of one embodiment of a system according to the invention, implemented in software within the aircraft's computer system. FIGS. 3A through 3C are flow charts of one embodiment of a method according to the invention, implemented as a computer process executed by the aircraft's computer system. FIGS. 4A, B are pictorial diagrams of how an aircraft using the method and system of the invention responds to known and previously unknown threats.

Referring again to FIG. 2, there is shown a structure chart that represents an embodiment of a system 21 according to the invention. At the core of the system 21 is a threat avoidance process 22 that executes the steps to be described hereinafter. The process 22 communicates with a number of modules that provide it with data for its operation. These modules include a threat detection module 23 that detects new, previously unknown threats. A threat recognition module 24 contains data about the type of threats and determines from the detection data what type of threat is detected. A planned route and waypoints module 25 contains data on the planned route. A set clearance levels module 27 contains data on the various set clearance levels. A set clearance refers to an altitude at which the aircraft is permitted to fly. An operator alerts module 28 aids in communicating data to the aircraft operator. Other modules, of course, may be included. The modular data may also be rearranged in equivalent ways using other modules.

FIGS. 3A through 3C are flow charts that represent an embodiment of a method according to the invention. For clarity, each step of the method is numbered. Initially, in FIG. 3A, the threat avoidance process comes into play when a new, previously unknown threat is detected and recognized by the aircraft's computer system (40). The threat is then located and its intervisibility is calculated in nearly real time, typically in less than 200 milliseconds (42). The planned route is then checked to determine if it is affected by the new threat's intervisibility, i.e., the planned route intersects the threat's intervisibility at the current set clearance level (44). If the planned route is not affected by the threat's intervisibility, then the threat avoidance process is complete until a new threat is detected (46).

However, if the planned route is affected, then a check is made to determine if the intervisibility intersection point is less than a predetermined distance from the aircraft, say, 5 NM (48). This step is to allow the aircraft operator to decide what action to take if there is sufficient time for him to do so. If the intersection point is too close, then a mission replan is executed at the current set clearance level (step A in FIG. 3A and following steps in FIGS. 3B and 3C). If there is sufficient time for operator involvement, he is advised of the situation and the route is checked against remaining set clearance levels, i.e., flying altitudes that might hide the aircraft from the threat because of the terrain, etc. First a check is made to see if there is another set clearance level acceptable to the operator, given the nature of the threat (steps 50–54). If so, then the operator may terminate the threat avoidance process and direct the aircraft to continue on the planned route (56), advisably at some lower set clearance. If there is no other acceptable set clearance level, then the operator executes a mission replan (step B in FIG. 3A and following steps in FIGS. 3B and 3C).

Turning now to FIG. 3B, the steps for a mission replan, in response to a new threat, are illustrated. For the situation where the replan, or route change, is automatic (step A), a startpoint for a new leg is on the current leg a few seconds ahead of the aircraft (60) (the time varies based on aircraft performance). For the situation where the operator is involved, the startpoint may differ. If the intervisibility of the new threat intersects the current leg of the planned route (62), then the startpoint is also on the current leg a few seconds ahead of the aircraft (60). However, if the intervisibility does not intersect the current leg, the process looks for the first waypoint before the intersection point (64). If first waypoint is within a predetermined distance of the intersection point (66), say, 2 NM, the startpoint is again on the current leg a few seconds ahead of the aircraft (60). If not, the first waypoint becomes the startpoint (68). Thus, the startpoint for the route change is a point on the current leg a few seconds ahead of the aircraft (60), unless it is safe for the aircraft to proceed to the first waypoint ahead, i.e., at the end of the current leg (68).

The destination, or endpoint, of the route change is then calculated and becomes the next sequential waypoint following the startpoint. First, the process finds the next waypoint beyond the intervisibility intersection point (70). For a startpoint on the current leg (60), the next waypoint would be the waypoint at the end of the current leg. For a startpoint at the first waypoint (68), the next waypoint would be the waypoint immediately beyond the first waypoint. This next waypoint becomes the destination (72, 74, 76), unless either of the following occurs. If the next waypoint is less than another predetermined distance from the aircraft (72), say 10 NM, or if the threat's intervisibility intersects both legs connecting to the next waypoint (74), then the following waypoint is the destination (78). This check (72, 74) minimizes the number of route changes by making sure that one route change is sufficient to avoid the new threat.

The mission replan is now complete. Referring to FIG. 3C, the threat avoidance process then executes the mission replan (80) and commands the aircraft to steer to the route change (82). This optimized evasive action, which is preferably automatic, is taken quickly after a new threat is detected. The process then pauses to give the aircraft operator an opportunity to accept or reject the replan (84). If the operator rejects the replan, he can command the process to try an alternative route. Or, he can accept it and terminate the process (86).

FIGS. 4A, B are examples illustrating the operation of the threat avoidance process of the invention. In FIG. 4A, a threat (T4) pops up and intersects the current leg 100 at the current set clearance (44). In this case, the aircraft 17 is less than 5 NM (48) from intersection point 102 and the intervisibility affects the current leg (62). A startpoint 104 is thus selected a few seconds ahead (60) automatically. TGT1 is the next waypoint beyond the intersection point 102 (70) and the aircraft distance to it is greater than 10 NM (72). The intervisibility does not affect both legs 100 and 106 at TGT1 (74), so TGT1 is selected as the destination waypoint (76). A replan is performed (80) and the aircraft is steered onto a new leg 108 (82). If the operator decides the route to TGT1 is acceptable (84), he can "accept," and processing is complete (86). If he rejects it (84), TGT2 is selected as the destination waypoint and a replan is made along another leg 110 to TGT2. Typically, the operator would accept this replan (84) and processing would again be complete (86).

Figure 4B:
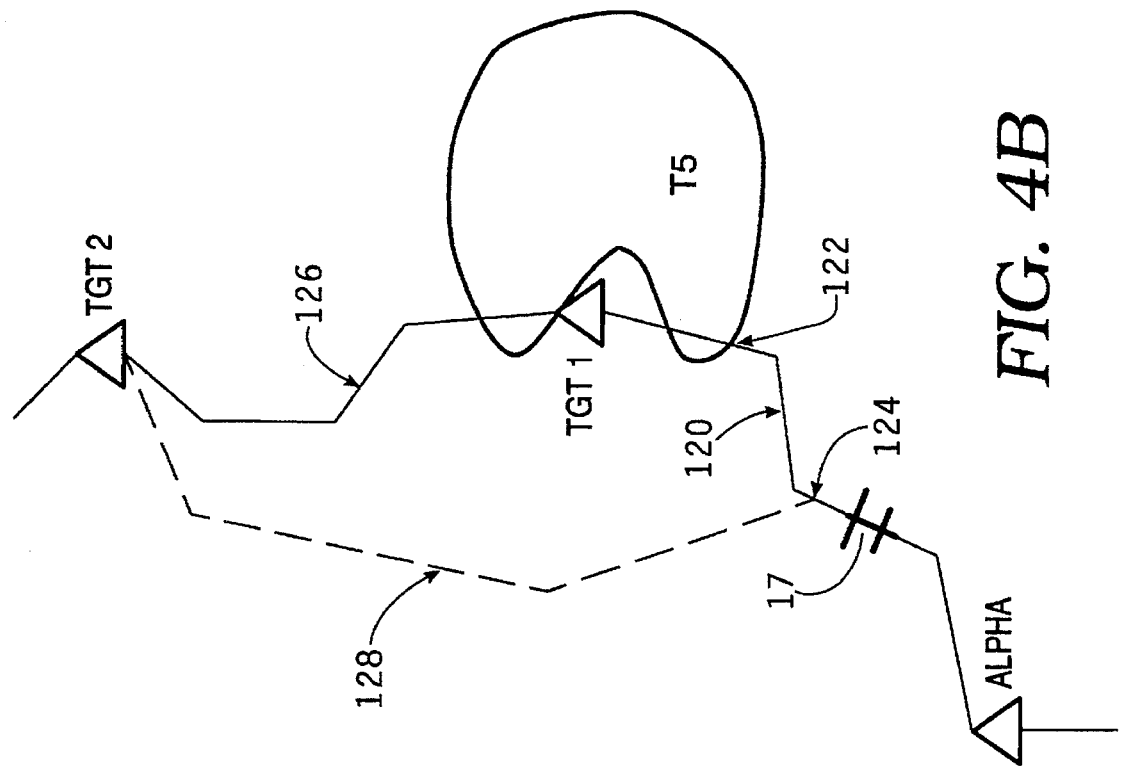
FIGS. 4A, B are pictorial diagrams of how an aircraft using the method and system of the invention responds to known and previously unknown threats.
Figure 4A:
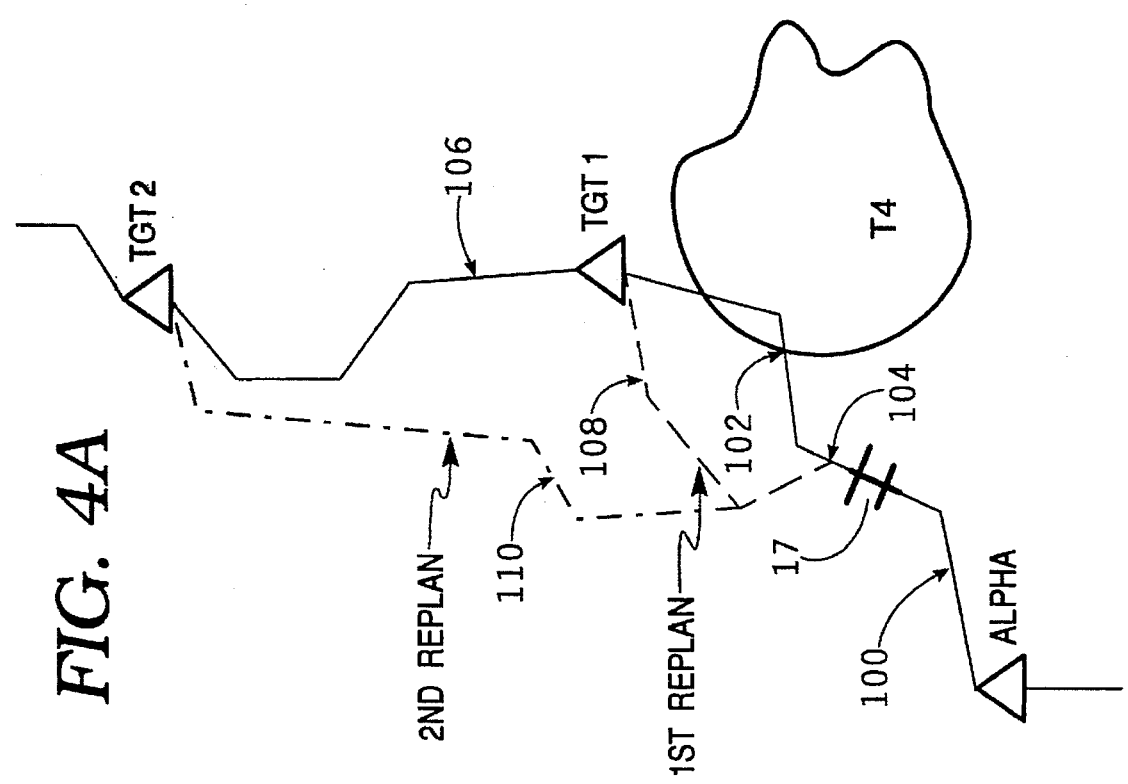

In FIG. 4B, a threat T5 pops up and intersects leg 120 further along the aircraft's route. In this case, the distance from aircraft 17 to the intersection point 122 is greater than 5 NM (48). The operator now has the option to select a lower set clearance (50) (altitude) which the threat intervisibility does not intersect. The planned route may remain acceptable (52) and processing would be complete (56). If, however, the operator desires a new route, processing continues (54). Since the intervisibility affects the current leg 120 (62), a startpoint 124 is chosen a few seconds ahead of the aircraft (60). TGT1 is the next waypoint beyond the intersection (70) and the distance to it is greater than 10 NM (72). However, the threat's intervisibility affects both legs 122 and 126 (74), so TGT2, the following waypoint, is selected as the destination waypoint (78). Only one replan is performed (80) to generate a new leg 128, minimizing the amount of operator interaction required.

This invention has been described herein in considerable detail in order to comply with the Patent Statutes and to provide those skilled in the art with the information needed to apply the novel principles and to construct and use such specialized components as are required. However, it is to be understood that the invention is not restricted to the particular embodiment that has been described and illustrated, but can be carried out by specifically different equipment and devices, and that various modifications, both as to the equipment details and operating procedures, can be accomplished without departing from the scope of the invention itself.

Having illustrated and described the principles of the invention in a preferred embodiment, it should be apparent to those skilled in the art that the invention can be modified in arrangement and detail without departing from such principles. For example, features of the invention may be implemented in hardware or software. Higher set clearance levels may be an option in some cases as well as lower set clearance levels.

Therefore, the illustrated embodiment should be considered only as preferred examples of the invention and not as a limitation on the scope of the claims. We therefore claim as our invention all modifications and equivalents to the illustrated embodiment coming within the scope and spirit of the following claims.

The embodiments of the invention in which an exclusive property or right is claimed are defined as follows:

1. A computerized method for an airborne aircraft to respond to an unknown threat where the aircraft detects a previously unknown threat, comprising the following steps:

determining a zone of intervisibility for the previously unknown threat;

determining if an aircraft's planned route intersects the zone of intervisibility with the threat;

if not, maintaining the aircraft's planned route;

if intersection of aircraft's planned route with the zone of intervisibility is less than a predetermined distance from the aircraft, automatically executing a lateral route change;

if intersection of aircraft's planned route with the zone of intervisibility is greater than the predetermined distance from the aircraft, notifying an aircraft operator of the threat and checking the threat against set clearance levels to determine if the aircraft's planned route may be followed at another acceptable set clearance level; and if another acceptable set clearance level is found, permitting the operator to choose between following the aircraft's planned route at said acceptable set clearance level or choosing the lateral route change.

2. The method of claim 1 wherein the step of executing a route change comprises:

calculating a startpoint for the route change;

determining the next waypoint in the planned route beyond the startpoint; and if the next waypoint is less than a predetermined distance from the aircraft, choosing a waypoint following the next waypoint as an endpoint for the route change.

3. The method of claim 2 wherein the step of executing a route change further includes:

if the next waypoint is greater than the predetermined distance from the aircraft, choosing the next waypoint as the endpoint for the route change, unless a threat's intervisibility also intersects the route planned between the next waypoint and the following waypoint.

4. The method of claim 1 including:

if no acceptable set clearance level is found, automatically executing a route change.

5. A system for an airborne aircraft to respond to an unknown threat where the aircraft detects a previously unknown threat, comprising:

means for determining a zone of intervisibility for the previously unknown threat;

means for determining if an aircraft's planned route intersects a zone of intervisibility with the threat and for responding as follows:

if not, maintaining the aircraft's planned route;

if intersection of aircraft's planned route with the zone of intervisibility is less than a predetermined distance from the aircraft, automatically executing a lateral route change;

if the intersection is greater than the predetermined distance from the aircraft, notifying an aircraft operator of the threat and checking the threat against set clearance levels to determine if the aircraft's planned route may be followed at another, acceptable set clearance level; and if an acceptable set clearance level is found, permitting the operator to change between following the aircraft's planned route at said acceptable set clearance level or choosing the lateral route change.

* * * * *